(12) United States Patent
Lu

(10) Patent No.: US 9,247,032 B2
(45) Date of Patent: Jan. 26, 2016

(54) METHOD FOR OFFLOADING PACKET SEGMENTATIONS AND DEVICE USING THE SAME

(75) Inventor: Kuo Cheng Lu, Hsinchu County (TW)

(73) Assignee: Mediatek Inc., Hsinchu (TW)

( * ) Notice: Subject to any disclaimer, the term of this patent is extended or adjusted under 35 U.S.C. 154(b) by 652 days.

(21) Appl. No.: 13/228,025

(22) Filed: Sep. 8, 2011

(65) Prior Publication Data

US 2012/0243540 A1    Sep. 27, 2012

(30) Foreign Application Priority Data

Mar. 23, 2011  (TW) .............................. 100109821 A

(51) Int. Cl.
*H04L 29/06*    (2006.01)

(52) U.S. Cl.
CPC ..................................... *H04L 69/166* (2013.01)

(58) Field of Classification Search
CPC ..................................................... H04L 69/166
See application file for complete search history.

(56) References Cited

U.S. PATENT DOCUMENTS

| | | | | |
|---|---|---|---|---|
| 5,548,587 | A * | 8/1996 | Bailey ................ | H04Q 11/0478 370/395.7 |
| 5,898,713 | A * | 4/1999 | Melzer et al. .................. | 714/807 |
| 5,937,169 | A * | 8/1999 | Connery .............. | G06F 13/387 709/250 |
| 6,359,887 | B1 * | 3/2002 | Brockhage ............ | H04J 3/0632 370/394 |
| 6,768,992 | B1 * | 7/2004 | Jolitz ..................... | H04L 29/06 1/1 |
| 7,318,089 | B1 * | 1/2008 | Stachura et al. ............. | 709/223 |
| 7,944,946 | B2 * | 5/2011 | Zhou et al. .................... | 370/474 |
| 8,370,717 | B1 * | 2/2013 | Geddes ............... | G06F 11/1076 714/758 |
| 2001/0012288 | A1 * | 8/2001 | Yu .......................... | H04L 29/06 370/352 |
| 2002/0046264 | A1 * | 4/2002 | Dillon ............... | H04B 7/18584 709/219 |
| 2002/0194415 | A1 * | 12/2002 | Lindsay ................ | G06F 1/263 710/305 |
| 2004/0049774 | A1 * | 3/2004 | Boyd .................. | G06F 11/2005 719/312 |
| 2004/0062275 | A1 * | 4/2004 | Siddabathuni ......... | H04L 47/36 370/474 |
| 2004/0230864 | A1 * | 11/2004 | Kim .................................. | 714/7 |
| 2005/0147126 | A1 * | 7/2005 | Qiu et al. ....................... | 370/474 |
| 2008/0056287 | A1 * | 3/2008 | Kagan et al. .................. | 370/401 |
| 2009/0304029 | A1 * | 12/2009 | Zhou ................... | G06F 12/1081 370/474 |
| 2009/0307363 | A1 * | 12/2009 | Zhou et al. .................... | 709/230 |
| 2010/0135324 | A1 * | 6/2010 | Pope ....................... | H04L 69/16 370/474 |

FOREIGN PATENT DOCUMENTS

| | | | |
|---|---|---|---|
| CN | 1905524 | 1/2007 | |
| CN | 101827072 | 9/2010 | .............. H04L 29/06 |

* cited by examiner

*Primary Examiner* — Andrew Lai
*Assistant Examiner* — Hoyet H Andrews
(74) *Attorney, Agent, or Firm* — Hamre, Schumann, Mueller & Larson, P.C.

(57) ABSTRACT

A method for offloading packet segmentations includes the steps of retrieving a packet segmentation offloading parameter in a packet and segmenting the packet into a plurality of sub-packets by taking consideration the packet segmentation offloading parameter. A device for offloading packet segmentations includes a packet parser configured to receive a packet to be transmitted, a header buffer controller configured to retrieve a header of the packet and connected to a buffer to access the header, an extractor configured to retrieve a packet segmentation offloading parameter in the packet, and a segmentation module configured to segment the packet into a plurality of sub-packets by taking consideration the header and the packet segmentation offloading parameter.

12 Claims, 9 Drawing Sheets

IP Header

| Version | IP Hdr Length | TYPE of service | Total length | |
|---|---|---|---|---|
| Identification | | | Flags | Fragment Offset |
| Time to Live | | Layer 4 Protocol ID | Header Checksum | |
| Source Address | | | | |
| Destination Address | | | | |
| Options | | | | |

TCP Header

| Source Port | | | Destination Port |
|---|---|---|---|
| Sequence Number | | | |
| Acknowledgement Number | | | |
| TCP Header Length | Reserved | Flags | Window |
| Checksum | | | Urgent Pointer |
| Options | | | |

FIG. 8

METHOD FOR OFFLOADING PACKET SEGMENTATIONS AND DEVICE USING THE SAME

BACKGROUND OF THE INVENTION

1. Technical Field

The present invention relates to a network transmission technique, and more particularly, to a method for offloading packet segmentations.

2. Background

In network communication protocol, transmission control protocol (TCP) and internet protocol (IP) are two of the most important protocols called TCP/IP, wherein the transmission control protocol puts a transmission control protocol header to the beginning of transmit data and becomes a transmission control protocol segment. The transmission control protocol segment puts an internet protocol header to the beginning of transmit data and becomes an internet protocol packet.

Offloading is a mechanism to transfer parts of tasks to a network interface device, such as a network interface card, to reduce the load of the central processing unit (CPU). Segmentation is a mechanism to segment a packet to a plurality of sub-packets for data transmission. TCP segmentation offloading (TSO) combines advantages of two methods to segment by the network interface device. In one implementation, a content of a transmission control segment is segmented into a plurality of segments, and assigns the internet protocol header based on an original internet protocol header. FIG. 1 shows the diagram for offloading a TCP segmentation. Referring to FIG. 1, the length of the internet protocol packet is 64 KB, including the internet protocol header, the transmission control protocol header and the payload. The payload of the internet protocol packet is segmented into 46 parts (in FIG. 1, n equal to 46) by the TCP segmentation. Accordingly, the internet protocol packet is segmented into 46 sub-packets with the length of 1448 byte, wherein each sub-packet also includes the internet protocol header, the transmission control protocol header and the payload. The CPU can finish a 64 KB packet transmission by a transmit command through the TCP segmentation offloading mechanism.

For the network interface device of a bus master with a direct memory access, the packet is transmitted by a pointer of a transmit descriptor to retrieve a transmit packet. FIG. 2 shows a diagram of the transmit descriptor. As shown in FIG. 2, the transmit descriptor stores a plurality of pointers, each pointing to the packet to be transmitted in the memory. To support the TCP segmentation offloading mechanism, the network interface device needs the packet segmentation offloading parameter, which includes packet segmentation data such as the maximum segment size data. Most of the traditional TCP segmentation offloading mechanism uses the descriptor to carry the network segmentation offloading parameter.

FIG. 3 shows a diagram for offloading the TCP segmentation according to the prior art. Referring to FIG. 3, the TCP segmentation offloading mechanism changes the descriptor architecture, and each pointer saves extra packet segmentation offloading parameter corresponding to the packet. However, the network interface device with the traditional TCP segmentation offloading mechanism must be compatible with the descriptor architecture, and changing the descriptor architecture increases system bus usage and decreases memory efficiency.

FIG. 4 shows a diagram for offloading the TCP segmentation according to another prior art. Referring to FIG. 4, the TCP segmentation offloading mechanism also changes the descriptor architecture, and the descriptor sequentially stores packet pointers and the corresponding packet segmentation offloading parameter. However, this TCP segmentation offloading mechanism still increases system bus usage and decreases memory efficiency.

FIG. 5 shows a diagram for offloading the TCP segmentation according to another prior art. Referring to FIG. 5, the TCP segmentation offloading mechanism puts the packet segmentation offloading parameter at the beginning of each packet, i.e., increasing the length of the packet to carry the packet segmentation offloading parameter. However, this kind of TCP segmentation offloading mechanism may not be implemented in most operating systems, and the increased length decreases the memory efficiency.

FIG. 6 shows a diagram for offloading the TCP segmentation according to the prior art. Referring to FIG. 6, the TCP segmentation offloading mechanism changes the description architecture, which stores the packet segmentation offloading parameter in corresponding pointer of the packet. Unlike the method in FIG. 3, the transmit descriptor does not sequentially store the pointer of the packet and the packet segmentation offloading parameter. However, the network interface device corresponding to such TCP segmentation offloading mechanism must be capable of distinguishing the pointer from the packet segmentation offloading parameter, and therefore would increase the design complexity.

The traditional TCP segmentation offloading mechanism is shown in FIG. 3 to FIG. 6, which all increases system bus usage and decreases memory efficiency. Moreover, the network interface device of a bus slave with the direct memory access, such as universal serial bus (USB) with remote network driver interface specification (Remote NDIS), can not change the specification and architecture; consequently, not suitable for the above TCP segmentation offloading mechanisms.

Accordingly, the industry needs a method and a device for offloading packet segmentations, without changing the present descriptor architecture to effectively achieve the TCP segmentation offloading, so as to be suitable for network interface devices of the bus slave with no direct memory access.

SUMMARY

One aspect of the present invention provides a method for offloading packet segmentations comprising the steps of retrieving a packet segmentation offloading parameter in a packet and segmenting the packet into a plurality of sub-packets by taking consideration the packet segmentation offloading parameter.

Another aspect of the present invention provides an offloading device of packet segmentation comprising a packet parser configured to receive a packet to be transmitted, a header buffer controller configured to retrieve a header of the packet and connected to a buffer to access the header, an extractor configured to retrieve a packet segmentation offloading parameter in the packet and a segmentation module configured to segment the packet into a plurality of sub-packets by taking consideration the header and the packet segmentation offloading parameter.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 8 shows a diagram of the packet header according to one embodiment of the present invention.

DETAILED DESCRIPTION

The method of the present invention for offloading packet segmentations segments a packet without referring to the information in certain fields of the packet header. Additionally, the packet segmentation offloading parameter is recited in predefined packet format and therefore the packet can be segmented without changing the packet length or descriptor architecture.

Figure 1:
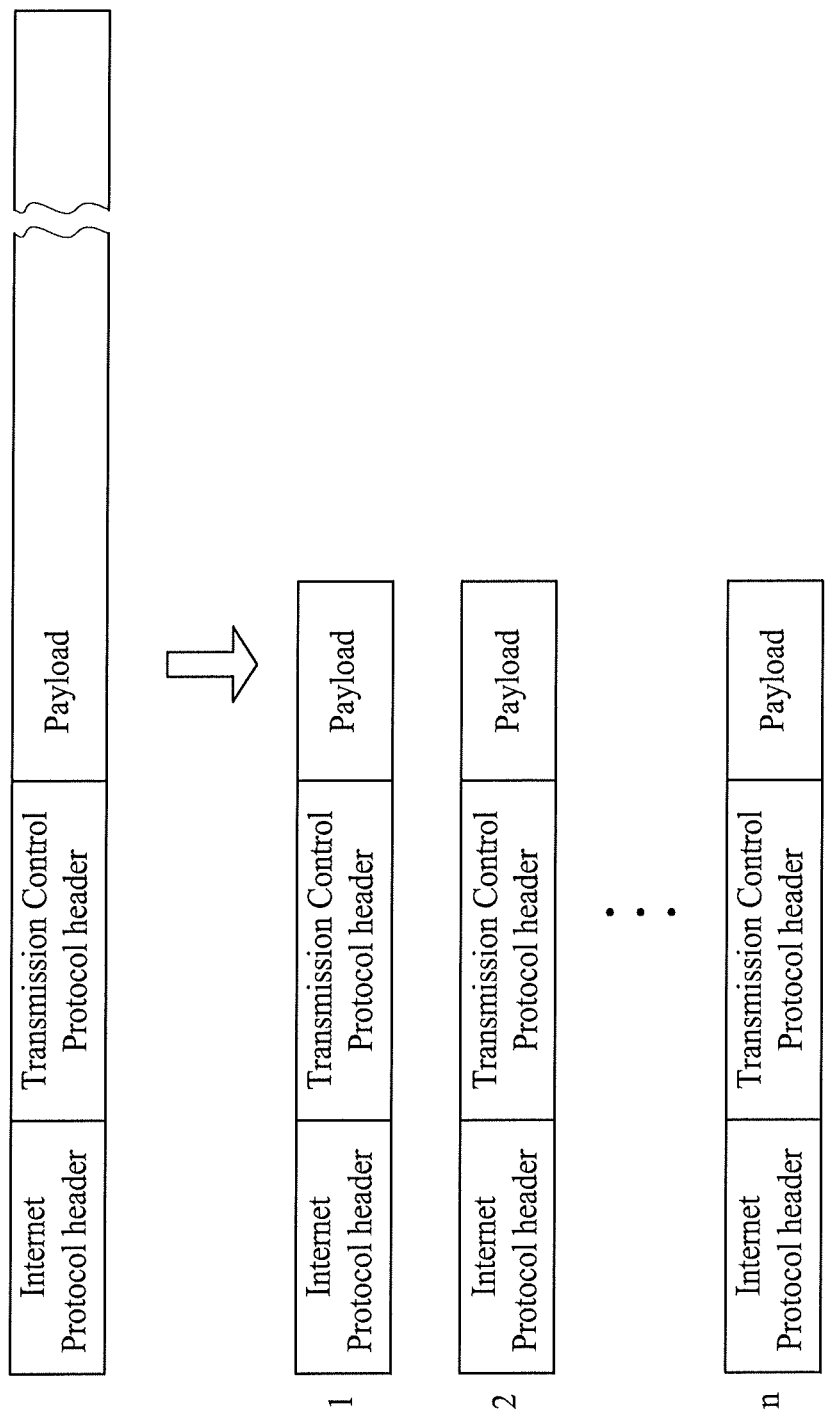
FIG. 1 shows the TCP segmentation offloading mechanism.
Figure 2:
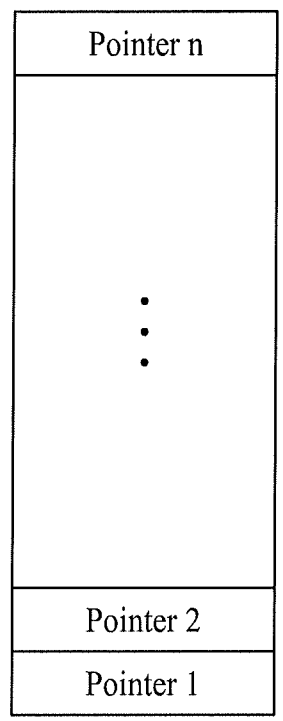
FIG. 2 shows the transmit descriptor.
Figure 3:
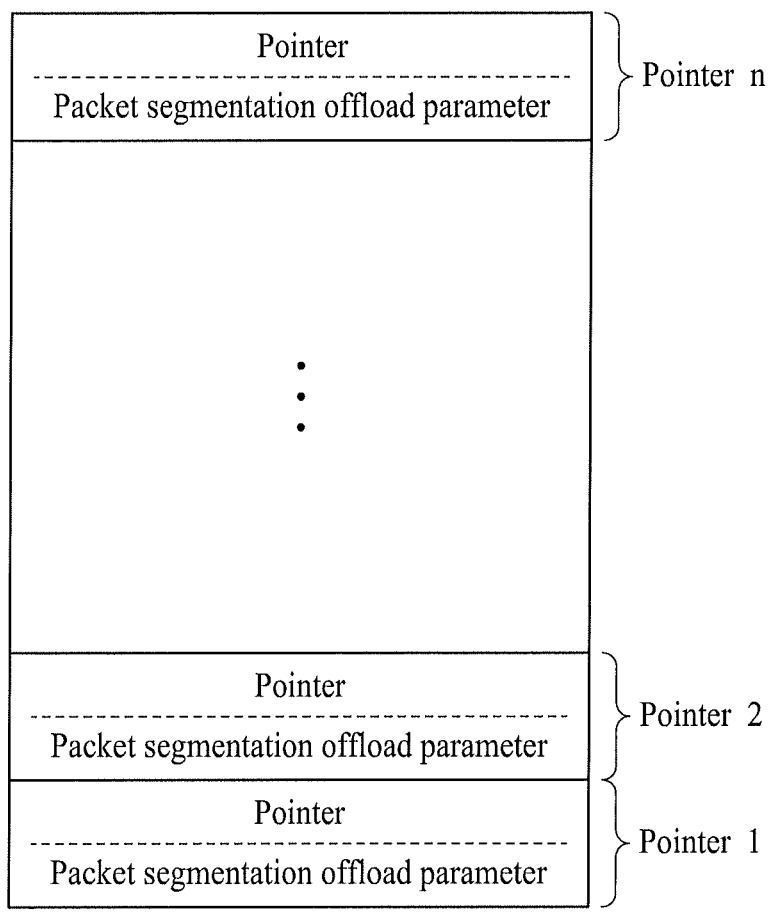
FIG. 3 shows the traditional TCP segmentation offloading mechanism.
Figure 4:
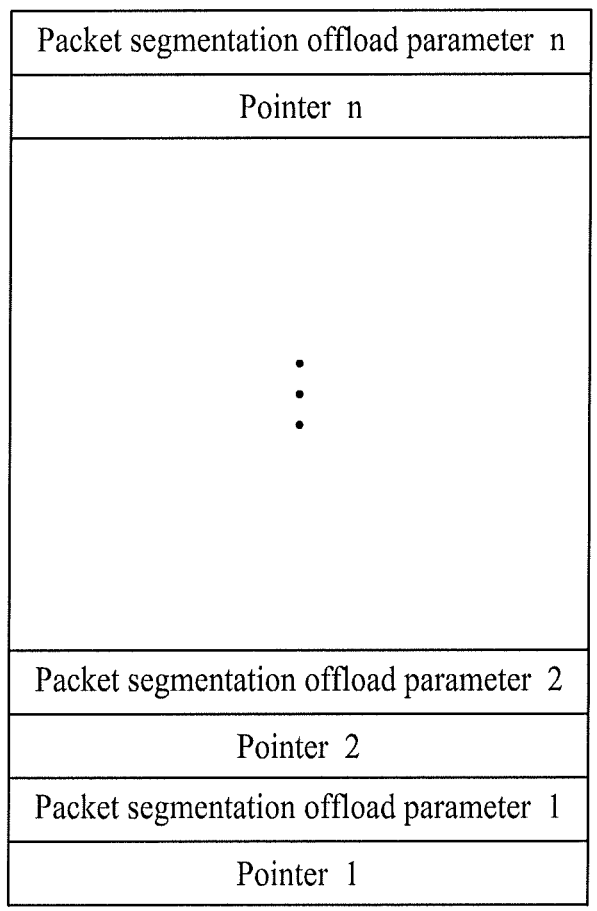
FIG. 4 shows another traditional TCP segmentation offloading mechanism.
Figure 5:
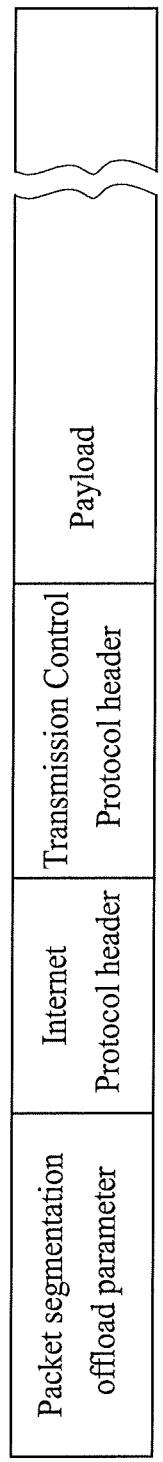
FIG. 5 shows a diagram of another traditional TCP segmentation offloading mechanism.
Figure 6:
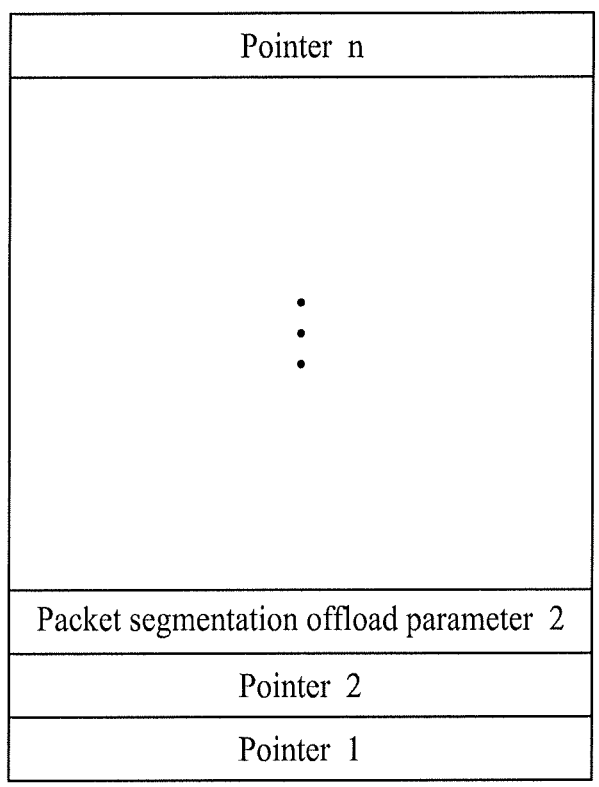
FIG. 6 shows another traditional TCP segmentation offloading mechanism.
Figure 7:
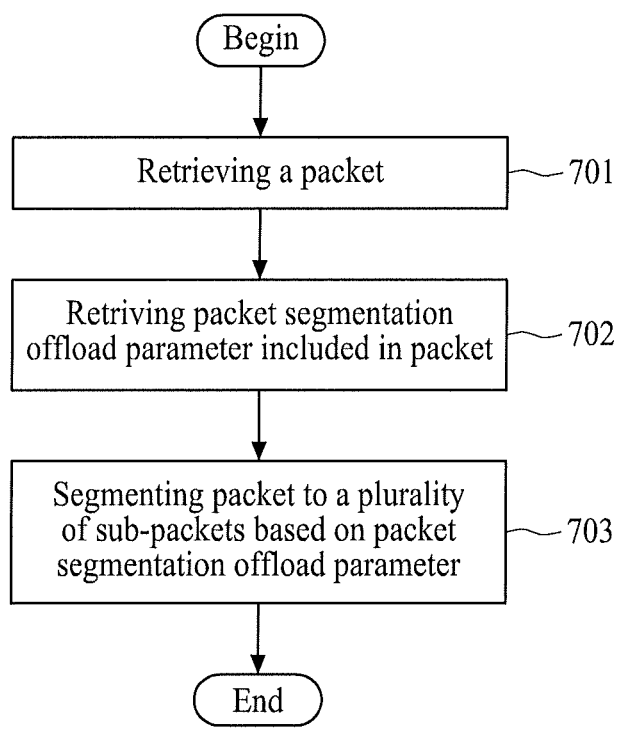
FIG. 7 shows a flow chart for offloading the packet segmentations according to one embodiment of the present invention.

FIG. 7 shows a flow chart for offloading the packet segmentations according to one embodiment of the present invention. As showing in FIG. 7, the packet is retrieved in step 701; the packet segmentation offloading parameter in the packet is retrieved in step 702; the packet is segmented into a plurality of sub-packets based on the packet segmentation offloading parameter. In one embodiment of the present invention, the method shown in FIG. 7 is applied to a network interface device with direct memory access mechanism or applied to the network interface device of a bus master, and the step 701 retrieves the packet by the direct memory access. In another embodiment of the present invention, the method shown in FIG. 7 is applied to the network interface device without the direct memory access or applied to the network interface device of a bus slave, and in step 701 the packet can be received by a host.

FIG. 8 shows a diagram of the packet header according to one embodiment of the present invention. Referring to FIG. 8, the packet has an internet protocol header and a transmission control protocol header. The internet protocol header includes the fields of version, internet protocol header length, type of service, total length, identification, flags, fragment offset, time to live, layer 4 protocol ID, header checksum, source address, destination address, and options. The transmission control protocol header includes the fields of source part, destination port, sequence number, acknowledgement number, TCP header length, reserved, flags, window, checksum, urgent pointer, and options.

As described in the previous paragraphs, when segmenting the packet, a payload of the transmission control protocol segment is segmented into a plurality of sub-packets, and the original length data recited in the length field of the packet header is not valid anymore. Similarly, when segmenting the packet, the payload of the internet protocol is segmented into a plurality of sub-packets, and checksum recited in the checksum field of the TCP head of the packet is not valid anymore. Besides, if the method is applied to the network interface device to automatically compute the checksum, the network interface device re-calculates the checksum for the data of each internet protocol header field. Accordingly, the packet segmentation offloading parameter of the corresponding packet can be recited in the above-mentioned field, without affecting the correctness of the other headers data or affecting the operation of the packet transmission.

Figure 9:
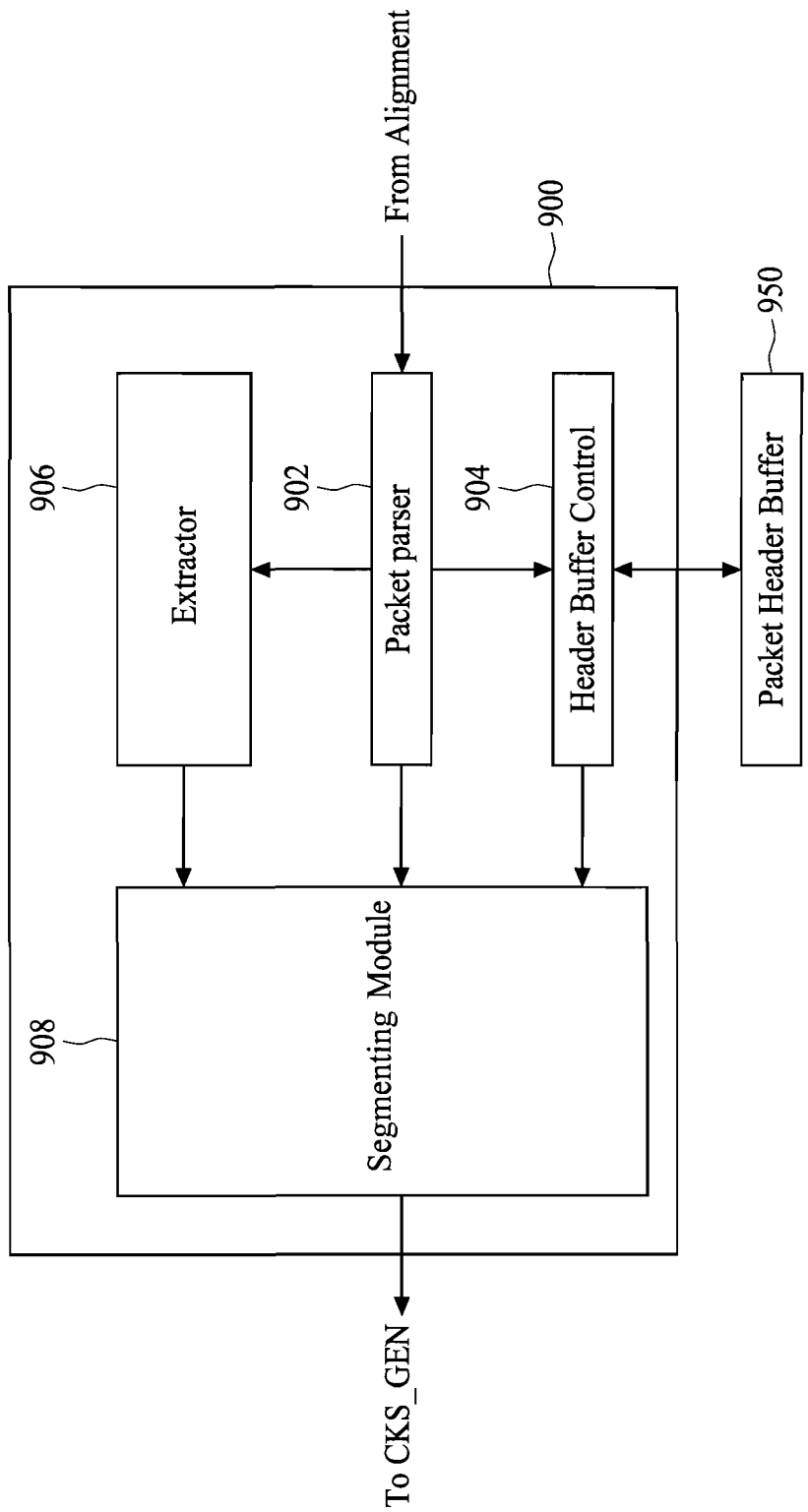
FIG. 9 shows a device for offloading packet segmentations according to one embodiment of the present invention.

FIG. 9 shows a device for offloading packet segmentations according to one embodiment of the present invention. Referring to FIG. 9, the device 900 comprises a packet parser 902, a header buffer controller 904, an extractor 906, and a segmenting module 908. The packet parser 902 receives from the bus a packet to be transmitted. The header buffer controller 904 is configured to retrieve the packet header, and access the header from the packet header buffer 950. The extractor 906 is configured to retrieve the packet segmentation offloading parameter of the packet. The segmenting module 908 is configured to segment the packet into a plurality of sub-packets based on the packet header and the packet segmentation offloading parameter. When finishing a packet segmentation, the segmenting module 908 is the device for providing the packet to the calculated checksum.

As described in the previous paragraphs, the device 900 does not need the data from the length field of the header, the header checksum, and the checksum field in the transmit packet. Accordingly, the packet needs the packet segmentation offloading parameter and the data stored in the fields of the packet length field, the checksum and the checksum field, and the extractor 906 retrieves the packet segmentation offloading parameter from the field of the packet.

In conclusion, the method of the present invention for offloading the packet segmentation uses the feature of segmenting the packet without using the data stored in some fields of the packet header, and uses these fields to recite the packet segmentation offloading parameter. Accordingly, the descriptor architecture is not changed, and the TCP segmentation offloading is achieved effectively. At the same time, the method of the present invention for offloading the packet segmentation can be applied to the network interface device without the direct memory access mechanism such as the bus slave.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

Accordingly, the appended claims are intended to include within their scope such processes, machines, manufacture, compositions of matter, means, methods, or steps.

What is claimed is:

1. A method for offloading packet segmentations, the method comprising:
    retrieving a packet segmentation offloading parameter in a packet; and
    segmenting the packet into a plurality of sub-packets by taking consideration the packet segmentation offloading parameter,
    wherein the packet segmentation offloading parameter is recited in a checksum field of the packet.

2. The method of claim 1, wherein the packet segmentation offloading parameter is recited in an internet protocol checksum field of the packet.

3. The method of claim 1, wherein the packet segmentation offloading parameter is recited in a transmission control protocol checksum field of the packet.

4. The method of claim 1, further comprising a step of retrieving the packet from a memory by using a direct memory access mechanism.

5. The method of claim 1, being applied to a network interface device of a bus master.

6. The method of claim 1, further comprising a step of receiving the packet from a host side.

7. The method of claim 1, being applied to the network interface device of a bus slave.

8. A device for offloading packet segmentations, the device comprising:
    a packet parser configured to receive a packet to be transmitted;
    a header buffer controller configured to retrieve a header of the packet, and connected to a buffer to access the header;
    an extractor configured to retrieve a packet segmentation offloading parameter in the packet; and
    a segmenting module configured to segment the packet into a plurality of sub-packets by taking consideration the header and the packet segmentation offloading parameter,
    wherein the extractor retrieves the packet segmentation offloading parameter from a checksum field of the packet.

9. The device of claim 8, wherein the extractor retrieves the packet segmentation offloading parameter from an internet protocol checksum field of the packet.

10. The device of claim 8, wherein the extractor retrieves the packet segmentation offloading parameter from a transmission control protocol checksum field of the packet.

11. The device of claim 8, being applied to a network interface device of a bus master.

12. The device of claim 8, being applied to a network interface device of a bus slave.

* * * * *